J. Wheelock,
Bridge Boat.
No. 4121. Reissued Sept. 13. 1870.
Fig. I
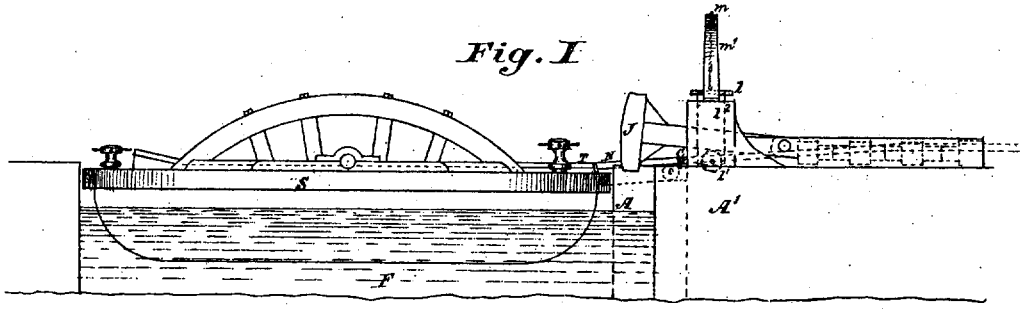
Fig. II
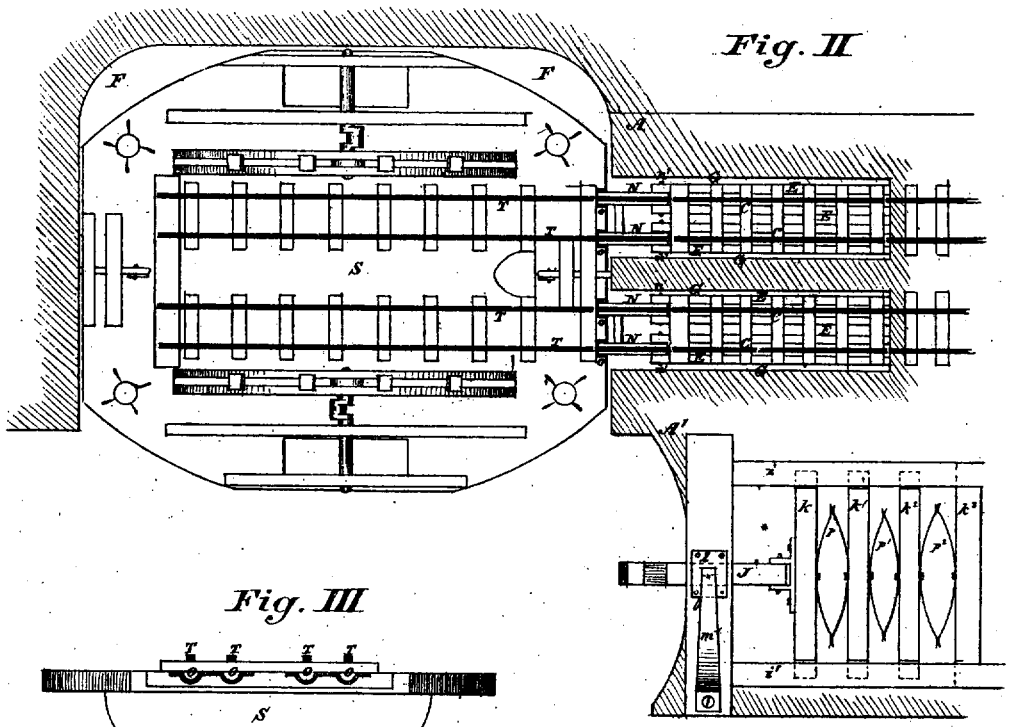
Fig. III
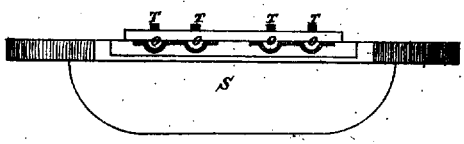
Jesse Wheelock
INVENTOR
Carl Waldau
B. H. Muehle
WITNESSES
H. PETERS, PHOTO-LITHOGRAPHER, WASHINGTON, D. C.

United States Patent Office.

JESSE WHEELOCK, OF LANCASTER, NEW YORK.

*Letters Patent No.* 22,759, *dated January* 25, 1859; *reissue No.* 4,121, *dated September* 13, 1870.

IMPROVEMENT IN BOATS FOR TRANSPORTING RAILROAD CARS.

The Schedule referred to in these Letters Patent and making part of the same.

I, JESSE WHEELOCK, of the town of Lancaster, in the county of Erie and State of New York, have invented certain new and useful Improvements in Boats and Docks for the Transportation of Railroad Cars Across Rivers, of which the following is a specification.

The first part of my invention relates to the arrangement and combination of a bumper-dock, with the main dock and slip for the reception of the boat, for the purpose of arresting the headway of the boat when it is entering the slip.

The second part of my invention relates to the combination of a boat having one or more railroad tracks upon deck, and provided with sockets for the reception of the ends of an adjustable or hinged track upon the dock-landing, for the purpose of forming a firm and secure connection of the tracks on the boat with those on the dock, and for holding the said tracks in line, and so that cars may be moved from the dock onto the boat, and *vice versa*.

In the accompanying drawing—

Figure I is a side elevation of the docks and boat when connected.

Figure II is a top plan view of the same.

Figure III is a bow-end elevation of the boat.

Letters of like name and kind refer to like parts in each of the figures.

A represents a dock or landing-place for a boat.

F is a slip of sufficient size to receive the boat, and guard it from the action of the waves or current of the river, or other navigable water upon which it plies.

E represents jointed beams, upon which the ties are laid which, support the rails C, making an adjustable track upon the dock, which may be raised or lowered as the difference in the level of the water or the height of the deck of the boat above such level may require.

G G are two narrow slips opening into the large boat-slip. They are of the proper size to allow the suspended tracks to move freely up or down within them.

The adjustable or hinged tracks E C may be supported and operated by any suitable or convenient mechanical devices, and may be subdivided, as shown, by the short sections N, forming the extreme ends of said track, and which are hinged at $n'$.

The boat S is provided with one or more tracks, T, corresponding in width of gauge and distance between centers (where there are two tracks) with those of the adjustable tracks E C N upon the dock.

O O represent sockets or recesses arranged at the bow of the boat, in such manner that the ends of the adjustable tracks E C N will rest in them, so that the said tracks will be held steady and in line with the tracks on the boat while the cars are being loaded or unloaded to or from the boat.

J represents a bumper-beam projecting from the bumper-dock A'.

The beam is hinged to the horizontal timber $k$, and resting on a roller, $l'$, hung in the frame $l$, which moves in guides $l^2$ on the dock, and is raised or lowered, and adjusted to the proper height, at which the boat will strike it, by means of the rope $m$ and spring $m'$.

$p$ $p^1$ $p^2$ are elliptic springs, arranged between the timbers $k$ $k^1$ $k^2$ $k^3$, the ends of which slide in grooves formed in the timbers $i$ $i'$.

The operation of my improvement is as follows:

The boat S having crossed the river or other navigable water, will, as it nears the dock or landing, be steered toward the bumper-dock, and, as it strikes the bumper-beam, its headway will be stopped gradually, and it may then be drawn into the slip F.

The adjustable track is then raised or lowered, as the case may be, until its ends rest in the sockets O O, in the bow of the boat. Connection being thus established between the tracks located on the dock and those on the boat, the cars may be loaded onto or unloaded from the boat by any convenient and practicable means.

*Claims.*

I claim as my invention—

1. The bumper-dock A', with the bumper-beam J, operating as described, in combination with the dock A and slip F, for the purpose and substantially as herein described.

2. The boat S, with the tracks T and the sockets or recesses O O, in combination with the adjustable tracks E C N upon the dock A, substantially as and for the purpose described.

JESSE WHEELOCK.

Witnesses:

CARL WALDAU,

B. H. MUEHLE.